United States Patent
Ahn (10) Patent No.: US 10,014,551 B2
(45) Date of Patent: Jul. 3, 2018

(54) ELECTRODE ASSEMBLY HAVING BENDING PORTIONS AND SECONDARY BATTERY INCLUDING THE SAME

(75) Inventor: Chang-Bum Ahn, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1073 days.

(21) Appl. No.: 13/113,455

(22) Filed: May 23, 2011

(65) Prior Publication Data

US 2012/0058387 A1    Mar. 8, 2012

(30) Foreign Application Priority Data

Sep. 2, 2010 (KR) ................. 10-2010-0085949

(51) Int. Cl.
*H01M 2/00* (2006.01)
*H01M 10/04* (2006.01)
*H01M 2/02* (2006.01)

(52) U.S. Cl.
CPC ....... *H01M 10/045* (2013.01); *H01M 2/0275* (2013.01)

(58) Field of Classification Search
CPC ........... H01M 10/045; H01M 10/0431; H01M 10/0583; H01M 10/0413; H01M 10/0454; H01M 10/0436; H01M 6/40; H01M 2/0275
USPC .................. 429/99, 163, 209, 211, 246, 162
See application file for complete search history.

(56) References Cited

U.S. PATENT DOCUMENTS

| 5,478,668 | A | * | 12/1995 | Gozdz et al. | ................. | 429/127 |
| 5,582,931 | A | * | 12/1996 | Kawakami | .................... | 429/127 |
| 6,287,721 | B1 | | 9/2001 | Xie et al. | | |
| 6,679,926 | B1 | | 1/2004 | Kajiura et al. | | |
| 2003/0108787 | A1 | | 6/2003 | Endo et al. | | |
| 2004/0045597 | A1 | * | 3/2004 | Kimijima et al. | ............ | 136/251 |
| 2004/0119442 | A1 | * | 6/2004 | Lee | ........................ | H02J 7/0042 |
| | | | | | | 320/112 |
| 2005/0019652 | A1 | * | 1/2005 | Fauteux | ........................ | 429/129 |
| 2006/0105233 | A1 | | 5/2006 | Morita | | |
| 2008/0280208 | A1 | | 11/2008 | Naoi et al. | | |
| 2010/0015529 | A1 | | 1/2010 | Kim et al. | | |

FOREIGN PATENT DOCUMENTS

| JP | 2001273930 | 10/2001 |
| JP | 2002222664 | 8/2002 |
| KR | 100624741 B | 9/2006 |
| KR | 100686859 B | 2/2007 |

OTHER PUBLICATIONS

Korean Office Action dated Sep. 25, 2012 by KIPO in the corresponding Korean priority application No. 10-2010-0085949.
Korean Office Action issued by Korean Patent Office dated Feb. 7, 2012 in connection with Korean Application No. 10-2010-0085949 and Request for Entry of the Accompanying Office Action attached herewith.

* cited by examiner

*Primary Examiner* — Jimmy Vo
(74) *Attorney, Agent, or Firm* — Robert E. Bushnell, Esq.

(57) ABSTRACT

A secondary battery having positive and negative electrode plates inserted into the interior of a pouch, and positive and negative electrode active material layers respectively coated on the positive and negative electrode plates are arranged at a constant interval. Bending portions are provided to bend positive and negative electrode non-coating portions respectively not coated with the positive and negative electrode active material layers.

13 Claims, 8 Drawing Sheets

ELECTRODE ASSEMBLY HAVING BENDING PORTIONS AND SECONDARY BATTERY INCLUDING THE SAME

CLAIM OF PRIORITY

This application makes reference to, incorporates the same herein, and claims all benefits accruing under 35 U.S.C. § 119 from an application earlier filed in the Korean Intellectual Property Office on Sep. 2, 2010 and there duly assigned Serial No. 10-2010-0085949.

BACKGROUND OF THE INVENTION

Field of the Invention

An aspect of the present invention relates to an electrode assembly and a secondary battery.

Description of the Related Art

In a secondary battery, it is increasingly required to use a shape that is suitable for various environments. However, in a conventional prismatic or cylindrical secondary battery, its shape is difficult to be freely modified. On the other hand, in the case of a pouch-type polymer battery, its shape may be modified to a certain extent. If the shape of the pouch-type polymer battery is freely modified, its application field can be greatly extended. However, an electrode assembly built in the pouch-type polymer battery should maintain a fixed shape. Therefore, it is technically required to modify the shapes of an electrode assembly and an outer casing, built in a pouch-type polymer battery for it to be suitable for different environments.

The above information disclosed in this Related Art section is only for enhancement of understanding of the background of the invention and therefore it may contain information that does not form the prior art that is already known to a person of ordinary skill in the art.

SUMMARY OF THE INVENTION

Aspects of the present invention provide for an electrode assembly having bending portions that enable to the electrode assembly to be freely folded or unfolded.

Still further, aspects of the present invention provide for a pouch-type secondary battery with a built-in electrode assembly, which has the structure of an outer casing capable of being more easily folded or unfolded according to the shape of the electrode assembly.

According to an aspect of the present invention, there is provided an electrode assembly including bending portions, the electrode assembly including: one or more positive electrode plates each having positive electrode active material layers formed by intermittently coating a positive electrode active material on a positive electrode collector and positive electrode non-coating portions respectively formed between the positive electrode active material layers; one or more negative electrode plates each having negative electrode active material layers formed by intermittently coating a negative electrode active material on a negative electrode collector and negative electrode non-coating portions respectively formed between the negative electrode active material layers; tab portions respectively formed to be extended from the positive and negative electrode plates; and one or more separators each interposed between the positive and negative electrode plates, wherein one or more of the positive and negative electrode non-coating portions have bending portions that enables the electrode assembly to be bent.

According to another aspect of the present invention, there is provided a secondary battery including a pouch-type case that accommodates the electrode assembly.

The bending portions may include bending lines formed at one or more of the positive and negative electrode non-coating portions. Separate concave groove portions may be formed at sides of regions of the positive and negative electrode non-coating portions, in which the bending lines are formed, respectively Separate auxiliary concave groove portions may be further formed at sides of positions of the separator, corresponding to the positions at which the bending portions are formed, respectively.

The electrode assembly may be formed by stacking a plurality of electrode assemblies.

The case may be provided with electrode-plate damage prevention plates respectively formed in regions corresponding to the positive and negative electrode active material layers of the electrode assembly. The electrode-plate damage prevention plate may be formed with a plastic or metal plate The electrode-plate damage prevention plates may be attached to inner or outer surfaces of the case using a double-faced adhesive tape.

The case may be provided with separate bending display portions respectively formed in regions corresponding to the bending portions of the electrode assembly.

As described above, according to aspects of the present invention, the shape of the secondary battery can be variously modified by providing an electrode assembly capable of be freely folded or unfolded.

Also, the secondary battery having the electrode assembly built therein can be applied to various fields.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 1:
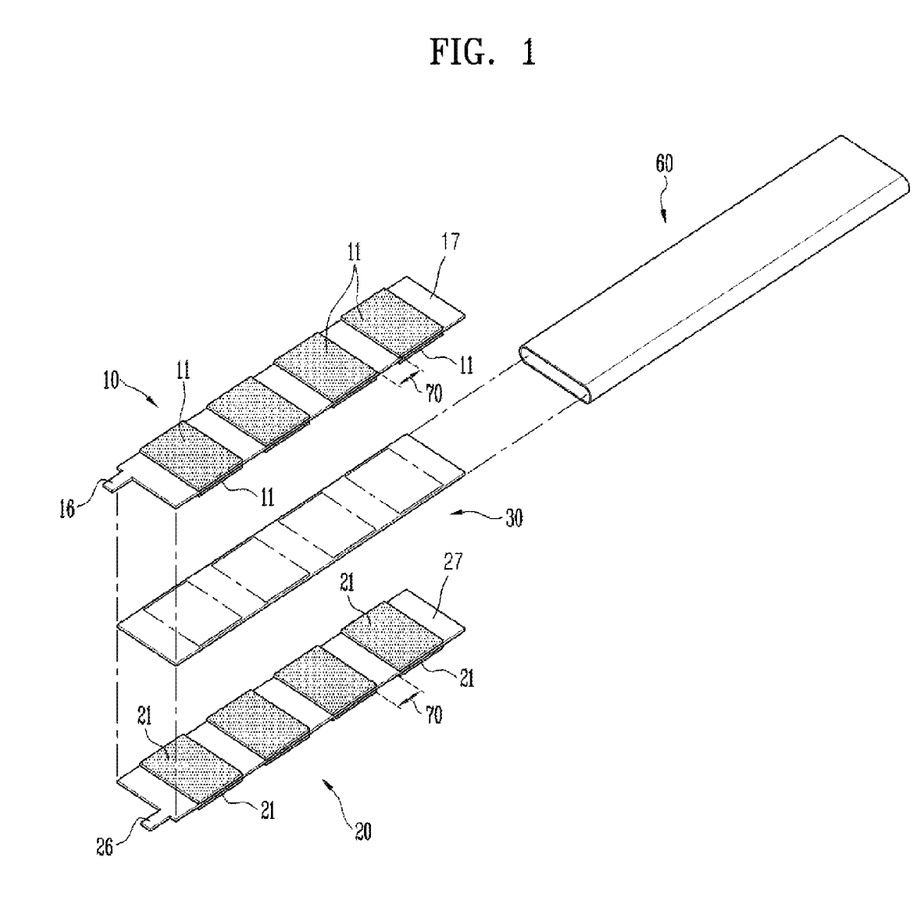
FIG. 1 is an exploded perspective view of an electrode assembly of a pouch-type secondary battery according to an embodiment of the present invention.

FIG. 1 shows an electrode assembly of a pouch-type secondary battery according to an embodiment of the present invention.

As shown in FIG. 1, the electrode assembly 50 according to this embodiment has a structure in which a positive electrode plate 10, a separator 30 and a negative electrode plate 20 are stacked. The positive electrode plate 10 may be formed by repeatedly forming positive electrode active material layers 11 and positive electrode non-coating portions 70 on both surfaces of a positive electrode collector. Here, the positive electrode active material layer 11 is formed by coating a positive electrode active material on both the surfaces of the positive electrode collector, and the positive electrode non-coating portion 70 is formed by coating no positive electrode active material on both surfaces of the positive electrode collector 17. Meanwhile, the negative electrode plate 20 may be formed by repeatedly forming negative electrode active material layers 21 and negative electrode non-coating portions 70 on both surfaces of a negative electrode collector 27. Here, the negative electrode active material layer 21 may be formed by coating a negative electrode active material on both the surfaces of the negative electrode collector, and the negative electrode non-coating portion 70 may be formed by coating no negative electrode active material on both surfaces of the negative electrode collector. That is, the positive and negative electrode active material layers 11 and 21 may be intermittently coated in a stripe shape on the respective positive and negative electrode plates 10 and 20, and both the positive and negative electrode non-coating portions 70 are provided between the positive and negative electrode active material layers 11 and 21, respectively. Separate electrode tabs 16 and 26 may be formed at the positive and negative electrode plates 10 and 20, respectively.

The separator 30 may be interposed between the positive and negative electrode plates 10 and 20 to form the electrode assembly 50. The electrode assembly 50 may be built in a separate pouch case 60.

In this embodiment, the positive and negative electrode non-coating portions 70 have bending portions that enable them to be bent, so that the whole or a part of the electrode assembly can be folded or unfolded. That is, in the pouch-type secondary battery according to this embodiment, the entire shape of the electrode assembly can be modified by forming the bending portions that enable the positive and negative electrode non-coating portions 70 not respectively coated with the positive and negative electrode active material layers 11 and 21 to be bent.

Referring back to FIG. 1, in this embodiment, the positive and negative electrode active material layers 11 and 12 may be continuously formed in a stripe shape at a constant interval on the positive and negative electrode plates 10 and 20, respectively. The positive and negative electrode active material layers 11 and 12 may be formed in the same area so that they can be identically overlapped with each other when the positive and negative electrode non-coating portions 70 are bent. In this embodiment, if the positive and negative electrode non-coating portions 70 are bent, the positive and negative electrode active material layers 11 and 21 are overlapped with each other, and the positive and negative electrode plates 10 and 20 may be formed in a zigzag pattern.

The electrode assembly 50 of this embodiment may be built in the pouch case 60, and may be bent in various shapes. For example, the secondary battery including the pouch case 60 having the electrode assembly 50 built therein may be entirely folded by bending the positive and negative electrode non-coating portions 70, if necessary. Alternatively, the folded secondary battery may be unfolded, if necessary. That is, the secondary battery has a folding/unfolding structure that enables it to be folded or unfolded like an accordion. The folding/unfolding structure means a structure of which folding or unfolding operation is possible.

FIGS. 2A to 2D more specifically show various bending portions in the electrode assembly according to the embodiment. In these figures, the bending portions of this embodiment will be more clearly described by exaggerating the size of the separator 30 in the electrode assembly as compared with those of the positive and negative electrode plates 10 and 20.

Figure 2A:
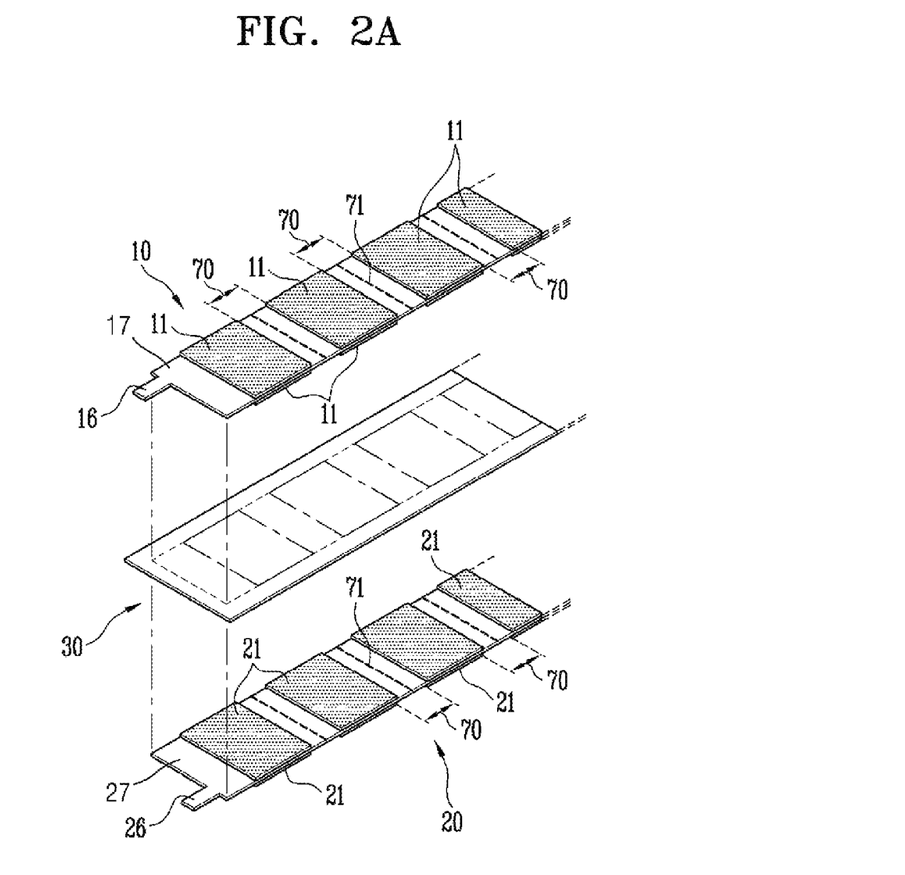
FIGS. 2A to 2D are exploded perspective views more specifically showing the electrode assembly of the pouch-type secondary battery according to the embodiment of the present invention.

In FIG. 2A, the positive and negative electrode plates 10 and 20 have bending lines 71 formed on the positive and negative electrode non-coating portions 70 not respectively coated with the positive and negative electrode active material layers 11 and 21. Here, the bending lines 71 serve as bending portions that enable the positive and negative electrode plates 10 and 20 to be easily bent.

Figure 2B:
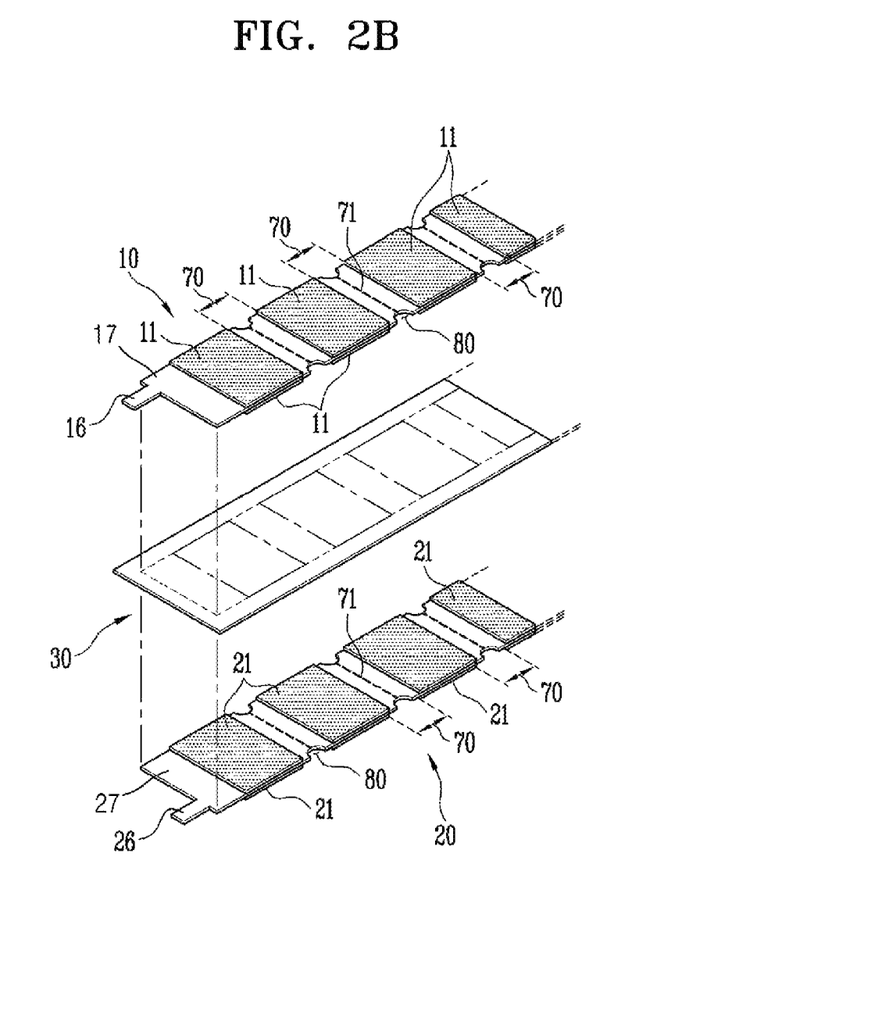

In FIG. 2B, semicircular concave groove portions 80 are formed at sides of the portion at which the bending line 71 is formed. The electrode assembly can be more easily folded or unfolded along the bending lines 71 thanks to the concave groove portions 80.

Figure 2C:
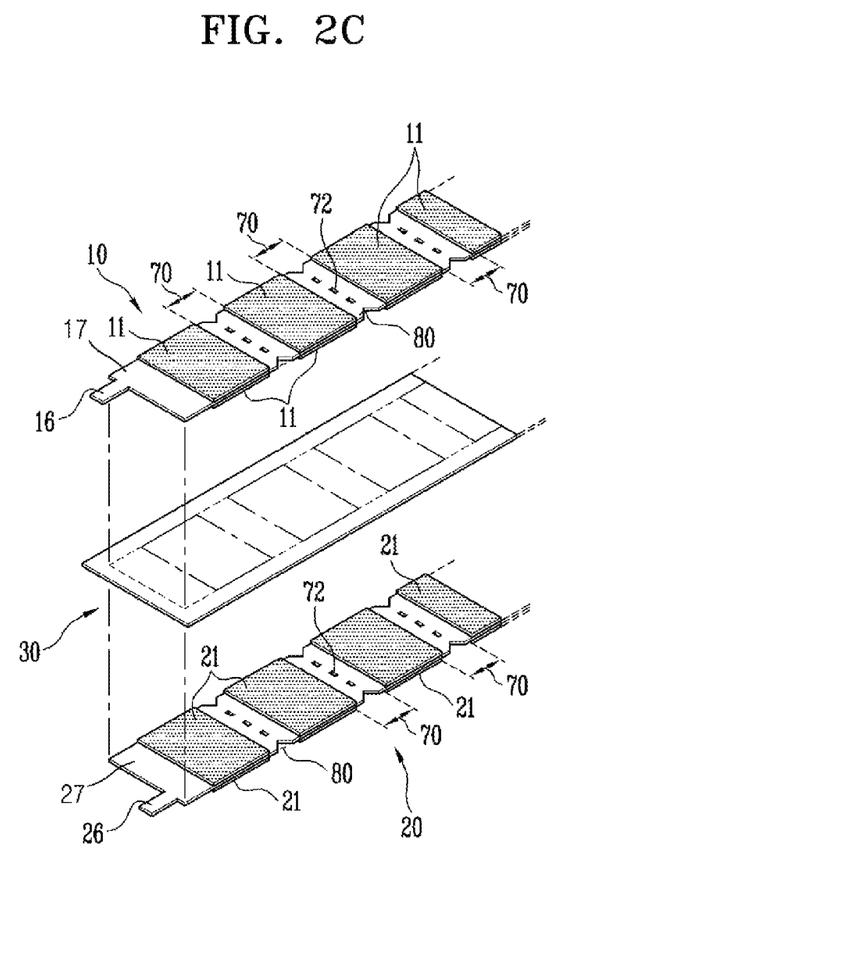

In FIG. 2C, bending portions are similar to the bending lines of FIG. 2A, but have another shape different from the bending lines of FIG. 2A. The bending portions are formed with a plurality of holes 72 spaced apart from one another at a constant interval. The holes 72 enable the electrode assembly to be more easily folded or unfolded.

Figure 2D:
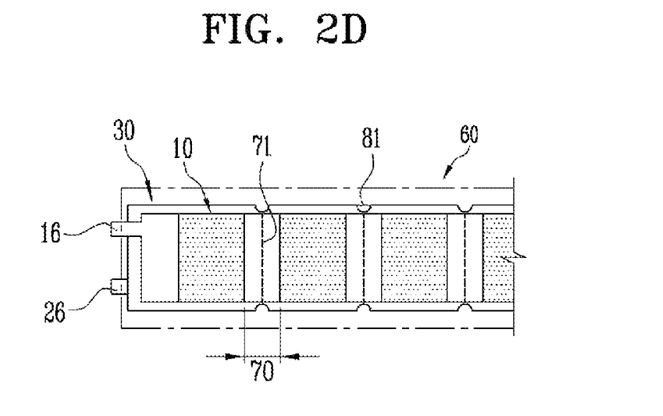

In FIG. 2D, auxiliary concave groove portions 81 are formed on the separator 30 so that the electrode assembly can be more easily folded or unfolded.

The bending lines 71, the plurality holes 72, the concave groove portions 80 and the auxiliary concave groove portions 81 as the aforementioned bending portions will be described in detail.

In this embodiment, the bending line 71 pressurizes a surface of each of the positive and negative electrode non-coating portions 70 to form a region thinner than other regions. Thus, the bending lines 71 enable the electrode assembly to be more easily bent. Meanwhile, as shown in FIG. 2C, a number of holes 72 punched in a vertical direction at a constant interval. Thus, the electrode assembly can be effectively folded or unfolded along the holes 72 formed in the width direction perpendicular to the length direction of the electrode assembly. However, in the case of the bending lines 71 may be spaced apart from one another so that the positive and negative electrode plates 10 and 20 themselves are not cut away or broken down.

In this embodiment, the concave groove portions having various shapes are formed at both the outermost sides of the bending line 71 that is a bending portion, i.e., at both the sides of each of the positive and negative electrode non-coating portions 70, respectively, so that the electrode assembly can be more easily bent. The shape of the concave groove portion 80 may be any one of a circular shape, an elliptic shape, a wedge shape and a polygonal shape.

In this embodiment, the auxiliary concave groove portions 81 may be formed on the separator 30 interposed between the positive and negative electrode plates 10 and 20. The auxiliary concave groove portions 81 may be formed at sides of regions of the separator 30, corresponding to the regions in which the bending lines 71 are formed, respectively. The regions of the separator 30 are identical to the regions in which the concave grooves 80 formed at the sides of the positive and negative electrode non-coating portions 70 are formed, respectively. Thus, when the electrode assembly of this embodiment is formed by stacking the positive electrode plate 10, the separator 30 and the negative electrode plate 20, the auxiliary concave groove portions 81 are formed at a constant interval at positions on the sides of the separator 30, corresponding to the positions at which the bending portions are formed, respectively. The auxiliary concave groove portions 81 are used to enable the electrode assembly to be more easily folded or unfolded.

Figure 3A:
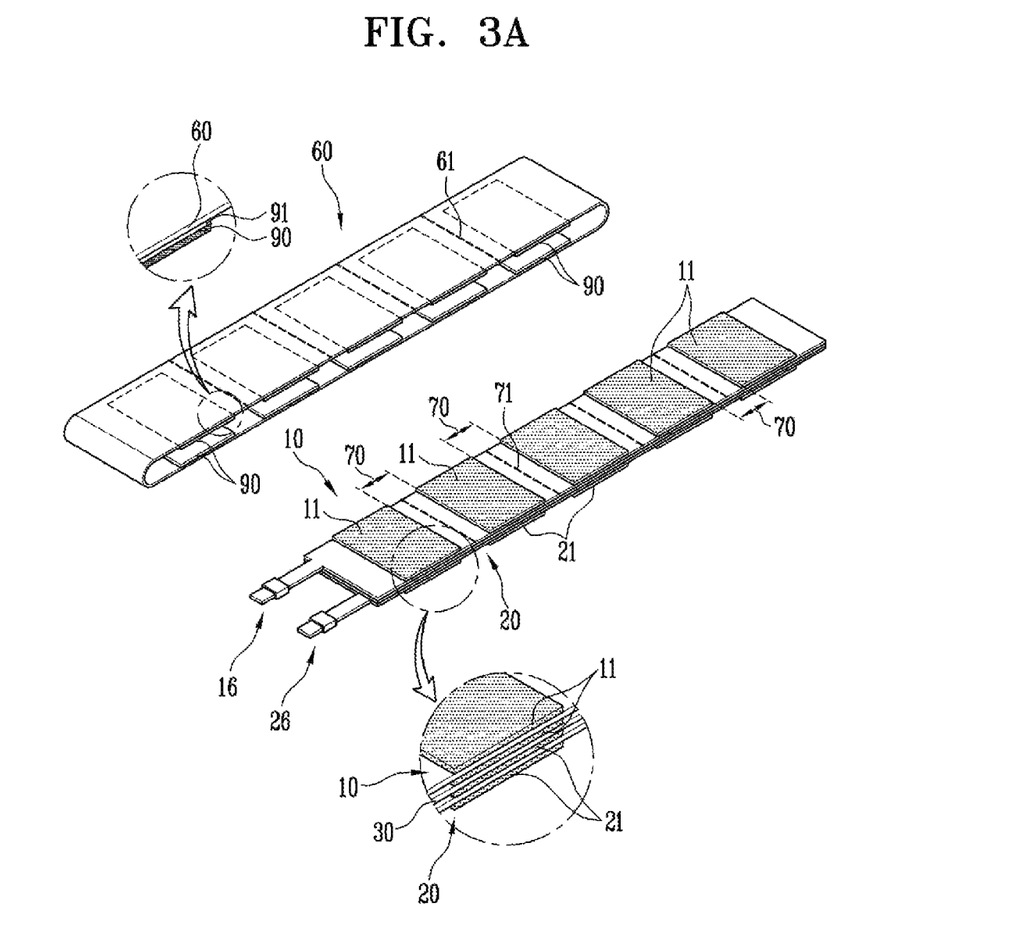
FIGS. 3A and 3B are views showing a secondary battery in which electrode-plate damage prevention plates are formed according to embodiments of the present invention.
Figure 3B:
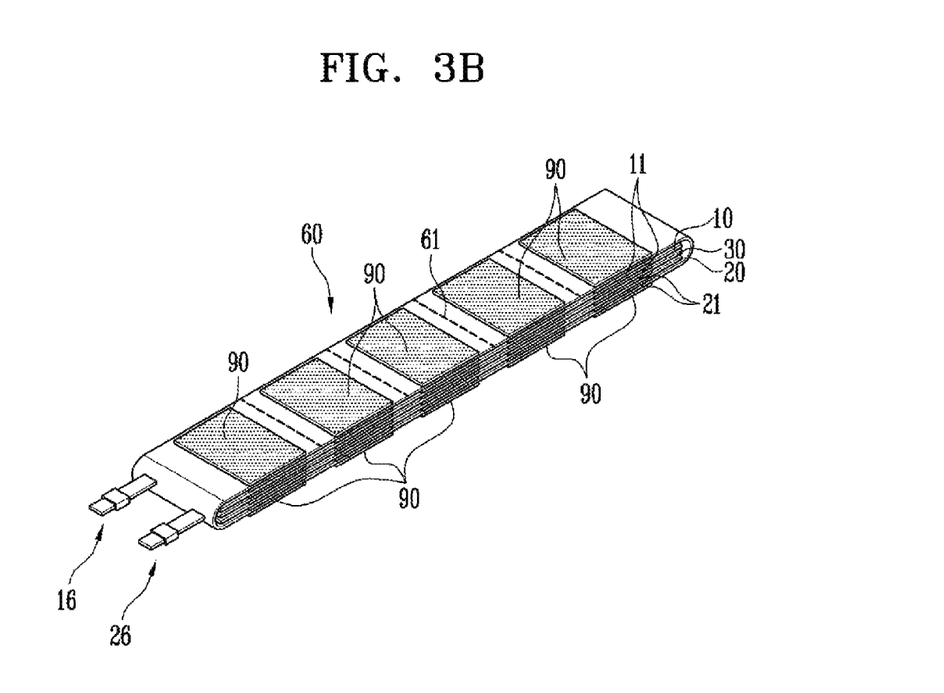

FIGS. 3A and 3B are views showing a secondary battery in which electrode-plate damage prevention plates may be formed according to embodiments of the present invention.

In the electrode assembly described in this embodiment, bending lines 71 and concave groove portions 80 may be formed on at least one of the positive and negative electrode non-coating portions as bending portions having various shapes, or auxiliary concave groove portions 81 may be separately formed on the separator 30, so that the electrode assembly can be easily folded or unfolded.

In another embodiment, there is provided a pouch case 60 having the electrode assembly built therein. The pouch case 60 may further include bending portions similar to the bending portions of the electrode assembly in regions respectively corresponding to the regions in which the bending portions of the electrode assembly are formed. Electrode-plate damage prevention plates 90 are formed in the pouch case 60 so that it is possible to prevent the positive and negative electrode plates 10 and 20 from being damaged when the electrode assembly is folded or unfolded.

As shown in FIGS. 3A and 3B, the electrode-plate damage prevention plates 90 are attached to inner or outer surfaces of the pouch case 60, respectively corresponding to the positive and negative electrode active material layers 11 and 21 coated on surfaces of the positive and negative electrode plates 10 and 20.

The electrode-plate damage prevention plate 90 may be formed using a metal or plastic plate having a constant thickness. The electrode-plate damage prevention plates 90 are used to prevent the positive and negative electrode active material layers 11 and 21 from being damaged or broken when the electrode assembly provided with the bending portions is folded or unfolded. Meanwhile, bending display portions 61 may be formed in a line shape between the electrode-plate damage prevention plates 90 attached to the inner or outer surfaces of the pouch case 60, respectively. The bending display portions 61 are formed at positions corresponding to the bending lines 71 formed on the positive and negative electrode non-coating portions 70 of the electrode assembly, respectively, so that the secondary battery including the electrode assembly can be more easily folded or unfolded.

The electrode-plate damage prevention plates 90 functions to enable the secondary battery to be more easily bend and to protect the positive and negative electrode plates 10 and 20. The portion at which the positive and negative electrode plates 10 and 20 are overlapped with each other is a battery cell, and the battery cell functions to collect electrons and positive charges. If the portion is bent or damaged, a serious problem may occur. Thus, the electrode-plate damage prevention plates 90 may also function to prevent the pouch case 60 from being bent at portions of the pouch case 60, respectively corresponding to the portions at which the positive and negative electrode active material layers 11 and 21 are formed in the positive and negative electrode plates 10 and 20, and the like.

In FIG. 3A, the electrode-plate damage prevention plates 90 are formed on the inner surfaces of the pouch case 60, respectively. On the contrary, in FIG. 3B, the electrode-plate damage prevention plates 90 are formed on the outer surfaces of the pouch case 60, respectively. Similarly, in the embodiment shown in FIG. 3B, the electrode-plate damage prevention plates 90 are attached to the outer surfaces of the pouch case 60, corresponding to the positive and negative electrode active material layers 11 and 21, respectively, so that it is possible to protect the positive and negative electrode plates 10 and 20 and to enable the positive and negative electrode non-coating portions 70 to be more easily bent. Separate bending display portions 61 may be provided between the electrode-plate damage prevention plates 90, respectively.

The electrode-plate damage prevention plate 90 may be formed using a thin metal or plastic plate as described above. However, since the electrode-plate damage prevention plate 90 has a higher hardness than the pouch case 60, a portion of the pouch case 60, to which the electrode-plate damage prevention plate 90 is attached, may have a hardness to a certain extent in which it is not bent or modified when the pouch case 60 and the electrode assembly are bent. The electrode-plate damage prevention plate 90 may be attached to the pouch case 60 using a double-faced adhesive tape 91. It will be apparent that the electrode-plate damage prevention plate 90 may be attached to the pouch case 60 using an adhesive.

Figure 4:
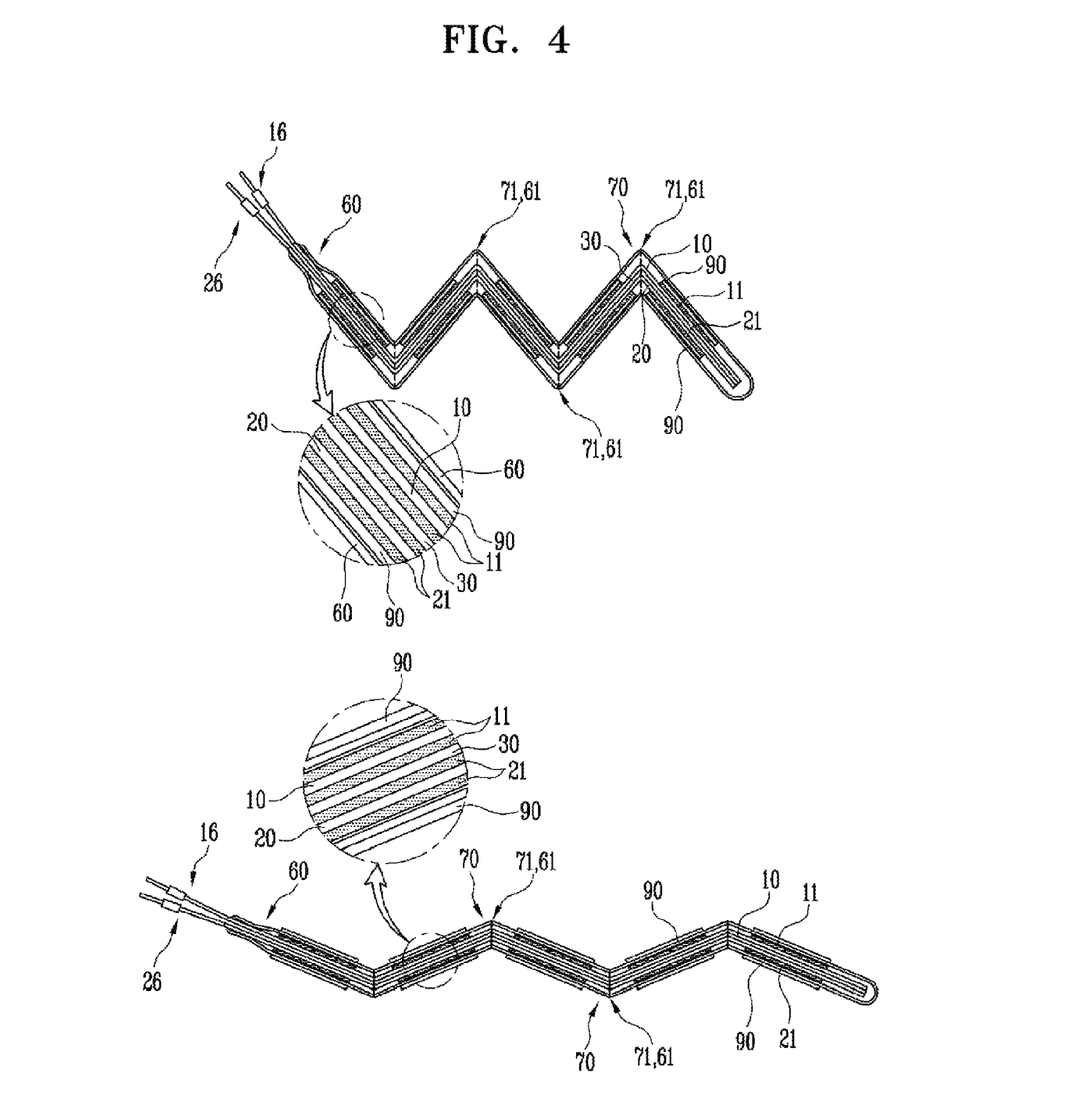
FIG. 4 is a view showing a bent shape of a secondary battery according to an embodiment of the present invention.

FIG. 4 is a view showing a bent shape of a secondary battery according to an embodiment of the present invention.

That is, in the pouch-type secondary battery according to this embodiment, the electrode-plate damage prevention plates 90 are attached to the inner or outer surfaces of a pouch case 60, respectively. Subsequently, separate bending display portions 61 are formed on regions of the pouch case 60, corresponding to the positive and negative electrode non-coating portions 71 and the positions at which the bending lines 71 are formed, respectively, so that the pouch case 60 can be more easily bent.

That is, in a case where the separate bending display portions 61 are formed on the outer surfaces of the pouch case 60, respectively, they enable the pouch case 60 to be more easily folded or unfolded together with the bending lines 71 of the electrode assembly built in the pouch case 60.

In this embodiment, the electrode assembly built in the pouch case 60 by stacking the positive electrode plate 10, the negative electrode plate 20 and the separator 30 may be formed into a multi-layered structure. That is, an electrode assembly formed into a multi-layered structure is accommodated in the interior of the pouch case 60, and bending portions are formed to enable the electrode assembly to be more easily folded or unfolded. Accordingly, the pouch-type secondary battery can be used in various fields that require high generation efficiency.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode assembly, comprising:
   a plurality of positive electrode plates each having positive electrode active material layers formed by intermittently coating a positive electrode active material on a positive electrode collector and positive electrode non-coated portions respectively formed between the positive electrode active material layers, said positive electrode active material of the plurality of positive plates having no direct physical contact with any portion of an adjacent positive electrode active material of the plurality of positive plates;
   a plurality of negative electrode plates each having negative electrode active material layers formed by intermittently coating a negative electrode active material on a negative electrode collector and negative electrode non-coated portions respectively formed between the negative electrode active material layers, said negative electrode active material of the plurality of negative plates having no direct physical contact with any portion of an adjacent negative electrode active material of the plurality of negative plates;
   tab portions respectively formed to extend from the positive and negative electrode plates;
   separators interposed between the positive and negative electrode plates, said positive electrode non-coated portions and said negative electrode non-coated portions forming bending portions located between each and every one of the negative and positive electrode active material layers, said bending portions traversing the longitudinal axis of electrode assembly in each and every one of the positive and negative electrode non-coated portions that enable the electrode assembly to be bent;
   concave groove portions comprised of cut-outs along respective longitudinal edges of the negative and positive non-coated portions of the corresponding negative and positive electrode collector that enable the electrode assembly to be bent, located on each end of the bending portions; and
   a pouch comprising a bending display portion for each and every one of said bending portions, said pouch being in direct contact with the negative and positive electrode active material layers of each of the negative and positive electrode plates of the electrode assembly and conforming to the shape of the electrode assembly, said pouch bending at each and every bending display portion in a zigzag manner as the electrode assembly bends at each and every one of said bending portions.

2. The electrode assembly according to claim 1, wherein the bending portions include bending lines formed at the plurality of the positive and negative electrode non-coated portions.

3. The electrode assembly according to claim 2, wherein the bending lines comprise holes formed and spaced apart from one another at a constant interval.

4. The electrode assembly according to claim 1, wherein the shape of the concave groove portions is any one of a circular shape, an elliptic shape, a wedge shape and a polygonal shape.

5. The electrode assembly according to claim 2, wherein auxiliary concave groove portions are further formed at sides of positions of the separator, corresponding to the positions at which the bending portions are formed, respectively.

6. The electrode assembly according to claim 5, wherein the shape of the auxiliary concave groove portions is any one of a circular shape, an elliptic shape, a wedge shape and a polygonal shape.

7. The electrode assembly according to claim 1, wherein the positive and negative electrode plates are formed in a zigzag pattern while the positive and negative electrode non-coated portions are bent by the bending portions.

8. A secondary battery, comprising:
   an electrode assembly comprising a plurality of positive electrode plates each having positive electrode active material layers formed by intermittently coating a positive electrode active material on a positive electrode collector and positive electrode non-coated portions respectively formed between the positive electrode active material layers, said positive electrode active material of the plurality of positive plates having no direct physical contact with any portion of an adjacent positive electrode active material of the plurality of positive plates;
   a plurality of negative electrode plates each having negative electrode active material layers formed by intermittently coating a negative electrode active material on a negative electrode collector and negative electrode non-coated portions respectively formed between the negative electrode active material layers, said negative electrode active material of the plurality of negative plates having no direct physical contact with any portion of an adjacent negative electrode active material of the plurality of negative plates;
   tab portions respectively formed to extend from the positive and negative electrode plates;
   a plurality of separators interposed between the positive and negative electrode plates; and
   a pouch accommodating the electrode assembly, said pouch including a plurality of electrode-plate damage prevention plates formed of rigid material corresponding in size, shape and location to each of the plurality of positive and negative electrode plates and being directly attached to inner or outer surfaces of the pouch, bending display portions formed in a linear shape in the pouch between each and every one of the plurality of electrode-plate damage prevention plates, said electrode-plate damage prevention plates being in direct physical contact with the pouch and in direct physical contact with the positive and negative electrode active materials of each and every one of the negative and positive electrode plates of the electrode assembly,
   each of the positive and negative electrode non-coated portions of the electrode assembly having bending portions located between each and every one of the positive and negative electrode coated portions that enables the electrode assembly to be bent, and the positive and negative electrode plates folded/unfolded in a zigzag manner while the positive and negative electrode non-coated portions are bent by the bending portions, said bending portions traversing the longitudinal axis of electrode assembly, concave groove portions comprised of cut-outs on the edges of the positive electrode collector and negative electrode collector at the negative and positive non-coated portions away from their centers, that enable the electrode assembly to be bent are located on opposite ends of each of the bending portions, and the bending display portions being located at positions corresponding to each and every one of the bending portions formed on the positive and negative electrode non-coated portions of the electrode assembly, the bending display portions bending with each and every one of the bending portions as the positive and negative electrode plates are folded/unfolded in the zigzag manner, and said pouch bending in the zigzag manner with the electrode assembly.

9. The secondary battery according to claim 8, wherein the electrode assembly is formed by stacking a plurality of electrode assemblies.

10. The secondary battery according to claim 8, wherein the electrode-plate damage prevention plate is formed with a plastic or metal plate.

11. The secondary battery according to claim 8, wherein the electrode-plate damage prevention plates are attached to the pouch with a double-faced adhesive tape.

12. The secondary battery according to claim 8, wherein the electrode-plate damage prevention plates are formed on one or more of inner or outer surfaces of the pouch.

13. The secondary battery according to claim 8, wherein the plurality of electrode-plate damage prevention plates are formed of a metal or plastic plate having a constant thickness.

* * * * *